United States Patent [19]
Ghatan

[11] Patent Number: 6,100,359
[45] Date of Patent: Aug. 8, 2000

[54] ABLATIVE POLYUREA FOAM AND PREPOLYMER

[76] Inventor: Sina Ghatan, 8200 W. Main, Belleville, Ill. 62223

[21] Appl. No.: 09/205,128

[22] Filed: Dec. 3, 1998

[51] Int. Cl.⁷ .............................. C08G 18/08; C08F 2/32; C08J 9/00

[52] U.S. Cl. ................................. 528/51; 528/10; 528/60; 528/65; 528/66; 528/72; 528/76; 528/79; 528/80; 528/102; 521/107; 521/110; 521/112; 521/134; 521/157; 521/159; 521/160; 521/168; 521/170; 521/171; 521/174; 521/180; 521/182; 524/801; 524/803; 524/806; 524/839; 524/841; 524/858

[58] Field of Search .................................. 528/51, 60, 65, 528/66, 72, 76, 79, 80, 102, 10, 107, 110, 112; 521/134, 157, 159, 160, 168, 170, 171, 174, 180, 182; 524/801, 803, 806, 839, 841, 858

[56] References Cited

U.S. PATENT DOCUMENTS

| | | |
|---|---|---|
| 3,647,724 | 3/1972 | Doerge et al. . |
| 4,207,417 | 6/1980 | Vofsi et al. . |
| 4,212,953 | 7/1980 | Sheratte et al. . |
| 4,281,097 | 7/1981 | Albright . |
| 4,365,026 | 12/1982 | Powloski et al. . |
| 4,407,981 | 10/1983 | Aaronson . |
| 4,439,546 | 3/1984 | Brennan et al. . |
| 4,439,549 | 3/1984 | Brennan . |
| 4,439,550 | 3/1984 | Brennan . |
| 4,442,237 | 4/1984 | Zimmerman et al. . |
| 4,442,238 | 4/1984 | Zimmerman et al. . |
| 4,444,918 | 4/1984 | Brennan . |
| 4,444,919 | 4/1984 | Brennan . |
| 4,444,920 | 4/1984 | Brennan . |
| 4,459,397 | 7/1984 | Richardson et al. . |
| 4,469,824 | 9/1984 | Grigsby, Jr. et al. . |
| 4,485,196 | 11/1984 | Speranza et al. . |
| 4,506,090 | 3/1985 | Brennan et al. . |
| 4,521,547 | 6/1985 | Anderson . |
| 4,526,906 | 7/1985 | Wegner . |
| 4,711,910 | 12/1987 | Statton et al. . |
| 4,743,624 | 5/1988 | Blount . |
| 4,803,230 | 2/1989 | Moroni et al. . |
| 4,859,713 | 8/1989 | Blount . |
| 4,999,383 | 3/1991 | Blount . |
| 5,151,216 | 9/1992 | Liu . |
| 5,391,665 | 2/1995 | Matsunaga et al. . |
| 5,556,894 | 9/1996 | Fishback et al. . |
| 5,728,746 | 3/1998 | Sicken . |

*Primary Examiner*—Samuel A. Acquah
*Attorney, Agent, or Firm*—Veo Peoples, Jr.; Patrick Wooley; Haverstock, Garrett & Roberts

[57] ABSTRACT

The present invention relates to an ablative fire resistant hydrophilic polyurea foam made from low molecular weight polyols capped with an isocyanate, with the polyol mixture including a fire retardant polyol that preferably includes carborane disilanol, with the fire retardant polyol containing the carborane disilanol imparting superior fire retardancy characteristics. The present invention also relates to a prepolymer for forming the polyurea foam and the present invention especially relates to the use of a carborane disilanol fire retardant polyol. The present invention also relates to a method for forming the polyurea foam and the prepolymer.

46 Claims, No Drawings

ABLATIVE POLYUREA FOAM AND PREPOLYMER

FIELD OF THE INVENTION

The present invention relates to a fire resistant foam prepolymer and a method for forming the foam prepolymer, as well as, a flexible fire resistant ablative polyurea foam formed from the foam prepolymer and a method for forming the foam. More specifically, the present invention relates to an ablative polyurea foam having a fire resistant moiety incorporated into the backbone of the foam, with the fire resistant moiety comprised of atoms selected from the group consisting of boron, silicon, phosphorous, and halogens, preferably the fire resistant moiety is an ablative moiety and is comprised of a carborane disilanol molecule as an integral part of the prepolymer, and an ablative foam prepolymer that is water activated. Thus, the present invention relates to an ablative fire resistant polyurea foam having a fire resistant moiety incorporated into the backbone of the foam, with the fire resistant moiety preferably being a carborane disilanol, and the foam prepolymer comprised of low molecular weight polyols and a fire retardant polyol.

BACKGROUND OF THE INVENTION

Flexible and rigid foams are used in a variety of applications including seat cushions, rigid plastic furniture, void fillers in walls, and insulation on pipes, and generally in the furniture, bedding, and vehicle industries to name but a few examples. Flexible foam, in particular, is often used as an insulative material to prevent the rapid spread of fire. Traditionally, flexible foams have been made from polyurethanes which can be flammable and may readily smoke when exposed to high temperatures and fire. In response polyurethane foams have been formed that are at least partially fire retardant and heat resistant, with the polyurethane foams made fire retardant by including a fire retardant constituent during formation of the polyurethane foam. Polyurethane foams can generally be made fire resistant by adding one of the following types of fire retardant constituents, a non-reactive liquid, an isocyanate-reactive additive, or a filler. Flexible and rigid foams spiked with various additive or filler fire retardants are often used as insulative materials to prevent the spread of small flames for a short time duration. Unfortunately, most polyurethane foams that include fire retardant fillers are known to melt and shrink and will not provide a long term thermal and fire protective insulative char necessary for a long duration of protection in hostile environments of heat and fire.

A variety of fire retardant constituents can be used in polyurethane foams, however, the fire retardants typically used in foams, and especially polyurethane foams, are either an additive type filler or a reactive type fire retardant, such as the isocyanate-reactive additive. Additive loaded fire retardants are fillers and do not become a part of the backbone or molecular structure of the foam and are instead held by the structure of the foam as a filler composition, meaning the filler fire retardants are not bound in the polymer network of the foam. Neither the additive or reactive type fire retardants are ablative and therefore are not considered to be effective insulators for use in a hyperthermal environment. Furthermore, the additively loaded fire retardant foams suffer from friability and leaching of the additives because they are not part of the backbone of the molecules used to form the foam and are instead held by the structures of the foam as a filler composition. In order to increase the fire retardancy of the foam, typically more filler fire retardants are added to the foam; however, as the amount of filler increases the physical and mechanical properties of the foam suffer. What this means is that to increase fire retardancy physical and mechanical properties must often be sacrificed. Thus, it is desired to have a foam which includes a fire retardant that is not a filler, but which instead has the fire retardant incorporated into the molecular structure or backbone of the foam so that the fire retardant is part of the polymer network. It is also preferred if the fire retardant not only imparts fire retardancy capabilities, but that it does not negatively effect the physical and mechanical properties of the foam. Importantly, it is desired to have a foam that possesses good fire retardancy or resistance and is relatively lightweight.

Reactive fire retardants have been used in some polyurethane foams, however, foams made from the reactive fire retardants are generally not water activated and are not ablative because they lack highly stable oxidative materials. Also, the reactive additives tend to adversely effect the viscosity of the prepolymers so that chlorofluorocarbon compounds (CFC) are typically used to foam a prepolymer. In fact nearly all commercial foams are blown by CFCs. This means that the prepolymer is undesireable to use because CFCs can be illegal to use in certain concentrations and are environmentally hazardous compounds. The impact of CFC regulations will have an impact on reactive fire retardant technologies used in the future, as CFC regulations may limit the amount of CFC available to be used. Such regulations may cause quality problems for the fire retardant foams formed with CFC. Because of CFC regulations, in some foam water is used as a partial replacement for the CFCs. Unfortunately, the water causes higher exotherms during the flexible foam formation. Because of the higher exotherm the foams have a tendency to scorch, with the scorching of the foam caused by degradation of fire retardants found in the foam prepolymer. Therefore the foam is scorched because typically the water has reacted with the reactive fire retardants to degrade the fire retardants and scorch the foam.

Many fire retardant foams use a chlorofluorocarbon (CFC) to foam the constituents and to form the finished polyurethane foam. The use of a CFC, as mentioned, is undesirable because it is environmentally unfriendly, as it is well known that CFCs are damaging to the ozone layer. As such, it is generally undesirable to form polyurethane foams which use CFCs in the foaming process. Consequently, it is desired to have a process which excludes the use of CFCs in forming polyurethane foams.

Isocyanate-reactive additives can be particularly useful in polyurethane and polyurea foams because the isocyanate-reactive additives become bound in the polymer network. Typically, the isocyanate-reactive fire retardant will cause the foam to char thereby inhibiting the spread of fire and the transmission of heat. But, the char is insufficient as the isocynate-reactive fire retardants do not form a sufficient char suitable for long term fire protection. While isocyanate-reactive foams are fire retardant, the fire retardant capabilities of such foams could still be improved and in general it is desired to improve the fire retardant capabilities of polyurethane and polyurea foams, as the polyurethane foams are known to burn and smoke despite the inclusion of fire retardants.

Incorporation of a fire retardant into a polyurethane or polyurea foam imparts at least some fire retardancy to the foam. However, for certain uses a foam that is highly fire retardant is required. Most polyurethane foams when exposed to sustained flames and heat will, after a time, breakdown and allow the continued dissipation of the fire and transmission of heat. It is desired to have a foam that does not lose significant mass as a result of sustained exposure to heat and flames and that does not allow the transmission of significant amounts of heat. Specifically, it is desired if the foam sustains integrity at a heat flux of 75 kW/m² for 20 minutes or longer and that allows heat equal to less than 250 kJ to evolve. It is also desired if the foam does not allow significant amounts of $CO_2$ and CO to be released. Preferably, less than 0.025 kg/kg of CO and 0.60 kg/kg of $CO_2$ will be released from the foam. As such, it is desired to have a flexible foam which when exposed to intense fire and heat retains most of its mass and does not allow for the transmission of significant amounts of heat.

Another problem associated with many polyurethanes or polyureas is that when the polyurethanes are formed hazardous fumes are often produced as a result of the reaction forming the polyurethane foam. Most prepolymers for forming a polyurethane foam have large amounts of unreacted N═C═O, typically close to 100% free N═C═O. Also, while the foam is being made some free N═C═O is released, so that when the foam is formed the free N═C═O is released into the atmosphere causing the production of hazardous fumes. Obviously, the production of toxins is environmentally unfriendly and is an undesired result associated with foam formation. It is desired to have a foam that when produced does not result in the formation of toxic fumes. More particularly, it is desired to have a prepolymer that has very little free N═C═O and it is desired to have a prepolymer that does not release significant amounts of N═C═O into the atmosphere during foam formation. It is also preferred that the foam is hydrophilic so that it can be catalyzed by an aqueous solution.

Ablative foams have been described, for example, in Liu U.S. Pat. No. 5,151,216, wherein the ablative foam is a low density foam. While an ablative foam capable of dissipating heat is described, it is not a water blown foam and the patent does not describe a carborane disilanol fire retardant incorporated into the molecular backbone or polymer network of the foam. Also, the patent does not teach forming a prepolymer and a synthesis does not occur. It is desired to have an ablative foam that is water blown and that can include a carborane disilanol fire retardant because water blown foams are environmentally friendly and a carborane disilanol in the molecular backbone imparts excellent fire resistance.

Polyurea foams which result from reacting a prepolymer with an amount of aqueous solution are known. These foams, however, typically have a filler fire retardant incorporated therein, with the filler added when the prepolymer is reacted with the aqueous solution. As such, the filler does not become part of the molecular backbone of the foam molecule. It is desired to have a polyurea foam which has a highly engineered molecular structure whereby the fire retardant is part of the molecular backbone of the finished polymeric foam.

An example of a polyurethane foam composition which does not have a fire retardant in the molecular backbone was disclosed in both Murch et al. U.S. Pat. No. 4,230,822 and Murch et al. U.S. Pat. No. 4,066,578. In both patents a prepolymer was made which included a hydrophilic polyoxyalkylene diol and a polyol having a hydroxyl functionality greater than 2, with the mixture capped by an isocyanate. The prepolymer was then reacted with an excess of water and a slurry containing a flame retardant such as alumina trihydrate or a phosphorous compound. An example of a phosphorous compound is ammonium polyphosphate. Importantly, because the fire retardant is incorporated into the foam during formation, the fire retardant is not included in the molecular backbone of the foam, instead the fire retardant is a filler. When a fire retardant is incorporated with the foam during foam formation the fire retardant will be a filler and not part of the molecular backbone. The Murch foams not only allow for the spread of fire eventually, but undesirably allow for the transmission of heat. Although the Murch systems temporally provide protection against the spread of flame, such systems allow the spread of heat from prolonged exposure to fire.

SUMMARY OF THE INVENTION

The present invention relates to an ablative flexible polyurea foam having an ablative fire resistant moiety incorporated into the molecular backbone of the foam, with the ablative fire resistant moiety preferably comprised of a carborane disilanol molecule. The fire resistant moiety will be part of the backbone of the polymeric foam so that the fire resistant moiety is not a filler but is instead part of the molecular or polymeric structure of the foam. As such, the fire resistant moiety is bonded to the other constituents used to form the foam. Importantly, the fire resistant moiety incorporated into the polyurea foam imparts excellent thermal and fire resistance capabilities. The use of the carborane disilanol as a fire resistant moiety is believed to distinguish the present polyurea foam from other polyurea and polyurethane foams. The polyurea foam comprised of the carborane disilanol has superior fire resistance as compared to other known foams which are similar to the present polyurea foam, so that when exposed to high temperatures and flames the polyurea foam will retain most of its mass as a hard char which protects the substrate from significant transmission of heat or the spread of flames. The present polyurea foam preferably retains at least 65% of its mass when exposed to heat flux equal to about 75 kW/m² by providing ablation through char formation. Also, the present foam will allow less than 230 kJ of heat to evolve. Comparatively, many other foams lose an amount of mass greater than 50% and in some cases greater than 90%; also, an amount of heat greater than 250 kJ will evolve. When exposed to heat and fire the ablative flexible polyurea foam of the present invention will char and preferably absorb $0_2$ in the gas phase.

Even though the present polyurea foam advantageously has excellent fire resistance, it still possesses good physical and mechanical properties. The foam can be formed in less than five (5) minutes and does not result in the production of toxic fumes, so that the foam and the method for forming it is environmentally friendly. A mixture of low molecular weight constituents are used to form the foam and the foam is water blown. Importantly, CFCs are not required to blow the foam. As such, the present polyurea foam is a non-shrinkable, smoke retardant, flexible, fire resistant, ablative hydrophilic polyurea foam that is easily formed and that has excellent fire and heat resistance capabilities. Water-blown urethane foaming, the process used to form the present foam, leads in a matter of minutes to the production of a highly "engineered" supermolecular architecture of foam from a mixture of relatively low molecular weight components.

It is important to recognize that the polyurea foam has the fire resistant moiety incorporated into the backbone or molecular structure of the foam. Most importantly, the fire resistant moiety is preferably formed into a fire resistant polyol. The most preferred fire resistant polyol used to form the present polyurea foam is comprised of a carborane disilanol molecule and more preferably the fire resistant polyol is selected from the group consisting of C,C'-Bis (hydroxydimethylsilyl)neocarborane and C,C'-Bis (hydroxydiphenylsilyl)neocarborane. The use of fire resistant polyols comprised of a carborane disilanol is believed to be new and unknown. The carborane disilanol appears to impart excellent fire resistance characteristics to the foam because the carborane disilanol has a high energy content and is highly stable as a result of a pseudo-aromatic character. Other fire retardant polyols, however, can be used to form the present polyurea foam, with the polyols containing fire retardant moieties selected from the group consisting of phosphorus, boron, silicon, and halogens. The most preferred foam contains a carborane disilanol fire resistant moiety and a fire retardant, so that two prepolymers are formed and the two prepolymers are combined to form a single prepolymer having a fire resistant moiety and a fire retardant. A foam can be formed that has only the fire retardant or the fire resistant moiety. It should be noted that fire resistant and fire retardant moieties will generally be referred to throughout as fire retardant moieties.

It is desired to have both a fire retardant moiety and a fire resistant moiety in the foam as the fire resistant carborane will allow for the formation of a char when the foam is exposed to heat and flame. The formation of a char will decrease the formation of flammable volatizable organic materials and carbon containing gases that help fuel the burning process. Also, the char does not readily burn and this inhibits the spread of heat and flames, as the char acts in the solid phase. Phosphorous and silicon compounds are also fire resistant moieties. A fire retardant compound will include halogen derived fire retardants. The halogens prevent the spread of flames by working in the gas phase. The halogens will remove hydrogen free radicals, for example, which are essential to sustaining the combustion process. Similarly hydroxyl free radicals and oxygen free radicals may be removed by the halogens. Thus, it is desired to have a foam that works to prevent fire in both the solid and gas phases.

To form the present polyurea foam a prepolymer capped by an isocyanate must first be formed. The prepolymer is formed by mixing together an amount of polyol with an amount of a fire retardant polyol or a fire resistant polyol. The polyol is preferably a glycol having a hydroxyl functionality equal to at least two (2), which can be mixed with an amount of isocyanate to form a foam prepolymer that is water blown. More preferably, the foam prepolymer is prepared by mixing a diol with a triol and the fire retardant or fire resistant polyol all in one single step, followed by adding an isocyanate to the diol triol fire retardant polyol mixture. Thus, the polyol mixture is capped in a single step to provide the prepolymer. The glycols used should have a molecular weight of at least 50, with the molecular weight being the sum of the atomic weights of the atoms of the molecule with the weights determined according to a standard periodic table. The isocyanate will cap the diol triol fire retardant mixture and is preferably a diisocyanate. It is most preferred if a polyol mixture comprised of a diol, a triol, and a fire retardant polyol is formed and if a polyol mixture comprised of a diol, a triol, and a fire resistant polyol is formed, with the three polyol mixtures then combined to form one polyol mixture that can be capped with an isocyanate to form the prepolymer.

Generally, the fire retardant or fire resistant polyol (referred from here forward as a fire retardant polyol) will be added in amount equal to between about 0.1% and about 10% by weight of the prepolymer and the polyol will be added in amount equal to between about 50% and about 80% by weight of the prepolymer. The isocyanate will be added in an amount equal to between about 20% and about 50% by weight of the prepolymer. It should be noted that it is preferred to use a triol in the prepolymer formation because the triol will allow for the formation of a branch chained foam molecule which will have better strength and tear resistance than a straight chained foam molecule. Diols are preferred for use because the diols produce a prepolymer that is water activated. More preferred are diols containing at least 30% ethylene oxide. Also, the isocyanate should be thoroughly reacted with the polyols so that less than 10% free N=C=O groups remain in the prepolymer. Prevention of free N=C=O groups allows the present polyurea foam to be environmentally friendly and to prevent the emission of toxic fumes when the foam is formed.

Once the prepolymer has been produced, the prepolymer is preferably mixed with an amount of aqueous solution to produce the polyurea foam. Water can be used, however, it is preferred to use an aqueous emulsion, preferably a silicon emulsion. Further, the prepolymer can be catalyzed by other constituents mixed with the aqueous solution to form the foam.

The present polyurea foam and prepolymer are considered new and unknown. The foam is desirable because it is believed to provide advantages over other known foams, in particular it is believed that the present polyurea foam has superior fire resistance capabilities. Also, the polyurea foam is easy to make and environmentally friendly. The polyurea foam is especially unique because the fire retardant polyol used to form the polyurea foam preferably includes a carborane disilanol molecule and even more preferably additionally includes another fire retardant moiety. Finally, it is believed that the use of a carborane disilanol is new and that prepolymers containing the carborane disilanol are novel.

DETAILED DESCRIPTION OF THE INVENTION

The present invention relates to a flexible fire resistant ablative hydrophilic polyurea foam, a prepolymer of the ablative polyurea foam, and methods for forming the ablative polyurea foam and the prepolymer. In particular, the present invention relates to the incorporation of a fire retardant moiety, a fire resistant moiety, or both (referred from hence forth as a fire retardant moiety) into the backbone of the ablative polyurea foam, with the fire retardant moiety containing atoms selected from the group consisting of boron, phosphorous, silicon, halogens, and combinations thereof. The fire retardant moiety will be part of a fire retardant polyol that is incorporated into the backbone of the ablative foam. Most preferably, the fire retardant moiety will be comprised of at least a carborane molecule of one of the following formulas $(CB_nH_{n+2})$, $(CB_nH_{n+4})$, and $(C_2B_nH_{n+2})$, where n equals 10, and a silicon to form a carborane disilanol fire retardant moiety which is reacted with a glycol to form an ablative fire retardant polyol used to form the ablative polyurea foam prepolymer and a foam from the prepolymer. Other fire retardant polyols can also be formed. As such, a polyurea foam is formed from a mixture of relatively low molecular weight components, including a fire retardant polyol, so that a water blown foam having a super molecular structure is formed.

To form the ablative foam, first a prepolymer is prepared by forming a polyol mixture containing a fire retardant moiety. Preferably, the prepolymer is comprised of three polyol constituents, a diol, a polyol fire retardant, and a triol, with the diol and triol each having a molecular weight of at least 50, and an isocyanate. To form the prepolymer it is preferred to first heat the diol to a temperature ranging between about 150° F. and about 220° F. so as to liquefy the diol. Any temperature, however, can be used so long as the diol is liquefied but not broken down. The diol can be heated in a variety of containers including a reaction kettle. It is desired to liquefy the diol because this allows for the polyol constituents to be easily blended together. Once the diol is liquefied, then the triol and fire retardant polyol can be added to the liquefied diol. After the polyols are liquefied and blended thoroughly the isocyanate will be added. If the melting point of the triol or fire retardant polyol is higher than the diol, then it may be necessary to raise the temperature of the diol to ensure that the triol and fire retardant polyol liquefy and are well dispersed in the solution. While it is preferred to liquefy the diol first, any of the polyols can be liquefied, with the other polyols then added to the liquefied polyol. Regardless, the polyols need to be mixed and generally the easiest way to mix the polyols together is by liquification.

After the polyol constituents are liquefied and well dispersed it is preferred to increase the temperature of the polyol solution to at least about 212° F. and more preferably about 250° F. to ensure the removal of water from the polyol solution. It is further desired to evacuate the reaction kettle to ensure that moisture is dissipated from the polyol solution. The removal of the water from the polyol solution is necessary because moisture remaining in the polyol solution can potentially react with the prepolymer solution and cause premature formation of foam. The time period for forming the polyol solution, including liquefaction of the polyol constituents and removal of excess water, will typically range between about 30 minutes and about one (1) hour. After the polyols have been mixed the isocyanate can be added to form the prepolymer or the polyol mixture can be allowed to sit for a period of time before the addition of the isocyanate. Before the addition of the isocyanate the reaction kettle containing the polyol mixture should be purged with nitrogen so that the polyol mixture is covered with a nitrogen blanket. The total time for forming the prepolymer, including the addition of the isocyanate, will generally range between about eight (8) and about twelve (12) hours. The addition of the isocyanate is complete once the desired amount of isocyanate has been added to the polyol mixture and once a sufficient amount of isocyanate has reacted with the polyol mixture. About 6% to 8% of the isocyanate will generally remain unreacted, meaning 6% to 8% of the N=C=O groups are unreacted in the prepolymer, this is also known as 6% to 8% free N=C=O. At the very least, there should be no more than 10% free N=C=O, as free N=C=O groups are generally undesirable because when the prepolymer is reacted to form the foam the N=C=O groups will be released. As mentioned, the N=C=O groups are hazardous.

The prepolymer will have less than 10% free N=C=O and will have a molecular weight ranging between about 1000 and about 2000. The molecular weight of the prepolymer is based on the amount of N=C=O groups in the prepolymer. Thus, the prepolymer is formed from a polyol solution containing a fire retardant, such as carborane disilanol, and an isocyanate. Also, the prepolymer will be water activated to form the foam.

The diol constituent can be any of a variety of molecules having at least two active hydroxyl groups and that can be reacted to form a polyurea foam. The diol should have a molecular weight of greater than 50, as molecular weights less than this will form a prepolymer that lacks sufficient viscosity. More particularly, the diol constituent should have a molecular weight ranging between about 50 and about 5000; more preferably the diol constituent will have a molecular weight ranging between about 400 and about 4000. The diol constituent should preferably have a minimum of from 5 to 30 carbon atoms. As such, a variety of diols can be used as long as the molecular weight ranges between about 50 and 5000 and the hydroxyls are reactive. The diol constituent is preferably any ethylene oxide rich polyethylene and more preferably a polyethylene glycol having an ethylene oxide content of at least 30%. The polyethylene glycol and similar types of glycols are preferred because they are hydrophilic and allow for the formation of a prepolymer that is readily catalyzed by water. Any diol, however, can be used to prepare the prepolymer and preferably the diol is hydrophilic and allows for the formation of a prepolymer catalyzed by water. The diol will generally be of the formula:

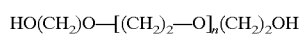

where n is equal to between 6 and 30.

Other diols that may be used include low molecular weight and high molecular weight polyols. Examples are aliphatic polyols and polyether polyols, as well as, low molecular weight aliphatic glycols such as ethylene glycol, diethylene glycol, triethylene glycol, tetraethylene glycol, propylene glycol, dipropyleneglycol, 1,3 butanediol, 1,4 butanediol, polybutylene glycol, 1,5 pentanediol, 2-methyl-1,3-propanediol, neopentyl glycol, 1,6 hexane diol, hexane-1,2,6-triol, butane-1,2,4-triol, octane-1,8 diol, and methyl glycoside.

The polyol fire retardant is comprised of a fire retardant moiety and a polyol, preferably a glycol. The fire retardant moiety is bonded to the polyol to allow the fire retardant moiety to be incorporated into the backbone of the ablative polyurea foam by having the fire retardant polyol react with the other polyol constituents to form a polyol prepolymer having the fire retardant moiety incorporated into the prepolymer backbone. Formation of the polyol fire retardant is important to allow the fire retardant moiety to be incorporated into the backbone of the polyurea foam and not be incorporated as a filler material in the foam. Further, the fire retardant moiety is part of the molecular structure and is not simply held in place as a filler material within the ablative foam.

The fire retardant moiety incorporated into the fire retardant polyol will be comprised of atoms selected from the group consisting of phosphorous, boron, silicon, halogens, and combinations thereof. It is preferred if the fire retardant moiety is a carborane disilanol molecule, with the carborane having a formula selected from the group consisting of $(CB_nH_{n+2})$, $(CB_nH_{n+4})$, and $(C_2B_nH_{n+2})$ where "n" is equal to 10. Specifically, it is preferred if the carborane molecule is a meta carborane. The term "carborane" is commonly used in a generic sense to describe compounds composed of boron, hydrogen, and carbon and whose molecular geometries are polyhedral or polyhedral fragments. Pertinent studies have concentrated on the utilization of carboranes as the building blocks for high temperature polymers because of their high energy content, high stability associated with their pseudo-aromatic character, and ease of derivatization. Polymers prepared from 1,7-dicarbo-closo-dodecacarborane (12)-1,7-diyl nuclei containing two siloxane moieties per carborane are believed to have the best balance of thermal stability and elastomer properties. After selection of the fire retardant moiety a polyol is formed, with the most preferred fire retardant polyols selected from the group consisting of C,C'-Bis (hydroxydimethylsilyl)neocarborane and C,C'-Bis (hydroxydiphenylsilyl)neocarborane. These are carborane disilanol polyols which can be included in the backbone of the polymeric foam, with the fire retardant polyols imparting excellent fire resistance characteristics to the finished foam. The carborane disilanol fire retardant polyol is preferably of the formula:

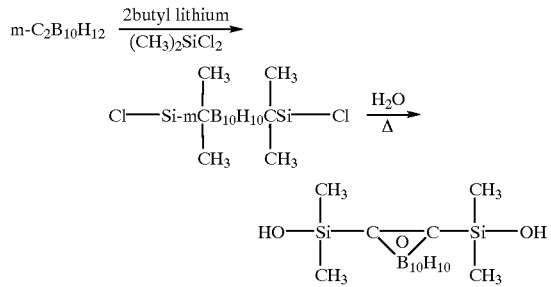

where R is equal to $CH_3$ or $C_6H_5$.

An example of how to form the fire retardant polyol and, in particular, the C,C'-Bis (hydroxydimethylsilyl) neocarborane is as follows:

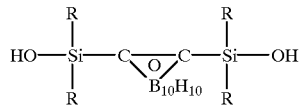

The m in the above formula stands for meta. Carboranes are preferred for use in the fire retardant polyol because the carboranes have a high energy content, high stability, and a pseudo-aromatic character, with the carborane molecule generally comprised of boron, hydrogen, and carbon atoms. Additionally, the carborane has a molecular geometry that is polyhedral. Carborane is selected because boron and silicon are ablative and are both part of the same moiety and cage structure.

Other fire retardant additives can be incorporated including ammoniumpolyphosphate, melamine, melamin phosphate mono and dipentaerythritol, aluminum trihydrate, borax, and zinc borate, and their salts, including ammonium pentaborate and melamine pyrophosphate.

A fire retardant with a high degree of oxidative stability is a preferred constituent for forming a desirable ablative foam. Carborane disilanol is an inorganic polymer that has high oxidative stability and the carborane disilanol is a co-curative that will create an ideal charring polymer for successful ablation. The element silicon is a likely choice for incorporation into the polymer structure of the present invention, since it is capable of forming the oxidative-resistant silica and will react endothermically with the polymer carbon to form a refractory silicon carbide. As such, some of the advantages of the present inorganic polymer of the present invention are high thermal stability, oxidative resistant residue, low carbon content, good mechanical properties, and excellent thermal stability due to the formation of the small cage or ring structures.

Additionally, phosphorous, silicon, and halogen compounds can be reacted with a polyol to form the fire retardant polyol, with these fire retardant polyols reacted with the other polyol constituents so that the fire retardant moiety is incorporated into the backbone of the foam molecule. The available phosphorous, silicon, and halogen fire retardant polyols can be selected from the group consisting of tetrabromophlthalate diol, tris(polyoxyalkylene) phosphonates and phosphite esters, tris(chlorinatedpolyol) phosphonates, dibromoneopentyl glycol, polyoxyethyl tetrabromo bisphenol A, tetrabromo bisphenol A, O,O-diethyl-N,N-bis(2-hydroxyethyl) amino methyl phosphonate, and tetrabromophthalate diols. These fire retardants tend to starve a fire of $O_2$ so that these fire retardants work in the gas phase. The carborane disilanol fire retardants cause the foam to char and form a barrier that prevents the spread of fire and the transmission of heat. The types of fire retardants used together are desirable because a char is formed and $O_2$ is absorbed in the gas phase.

An amount of a triol is mixed with the fire retardant polyol and the diol, with the triol added to the heated liquefied diol so that the triol is liquefied and mixed with the diol. The triol is added because it is a cross linker and chain extender, so that the addition of the triol will result in the formation of a branch chained foam molecule which will generally have more strength than a straight chain foam molecule. A foam formed only from the diol will be straight chained, whereas a foam formed from a triol and diol will be branch chained. Foams which have a branch chain molecular structure will generally have better mechanical properties, namely strength and tear resistance, than foams having a straight chain molecular structure. The triol has a hydroxyl functionality equal to 3. Any of a variety of triols can be used as long as the triol has three (3) active hydroxyl groups and a molecular weight ranging between about 50 and about 5000. More preferably, the triol should have a molecular weight ranging between about 80 and 4000. The triol should additionally have from about 5 to about 30 carbon atoms, and not require high temperatures to melt. Generally, the formula for a triol will be as follows:

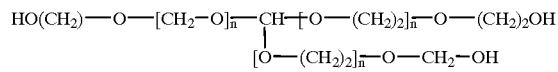

wherein "n" is equal to between 6 and 30. Among the available triols for use in the present invention are trimethylolethane, trimethylol propane, and high molecular weight triols. Trimethylolethane is the most preferred triol for use in forming the prepolymer. Also, in place of the triol, highly branched polyols may be used, for example, pentaerythritol, glycerols, sucrose, and similar sugars.

While triols and diols are preferred for use in the formation of the prepolymer other polyols can be used. In fact any polyol having at least one active hydroxyl group can be used, and even more preferably any polyol having from two (2) to eight (8) active hydroxyl groups can potentially be used to form the prepolymer. The polyol should have a molecular weight ranging between about 50 and about 5000, more preferably the polyol will have a molecular weight ranging between about 80 and 4000. Both low molecular weight and high molecular weight polyols can be used. Regardless of whether a diol, a triol, a combination of diol and triol, or other polyols are used, a prepolymer should be formed that can form a foam having an engineered super molecular structure. Examples of the polyols suitable for use are aliphatic polyols and polyether polyols, as well as, low molecular weight aliphatic glycols such as ethylene glycol, diethylene glycol, triethylene glycol, tetraethylene glycol, propylene glycol, dipropyleneglycol, 1,3 butanediol, 1,4 butanediol, polybutylene glycol, 1,5 pentanediol, 2-methyl-1,3-propanediol, neopentyl glycol, 1,6 hexane diol, hexane-1,2,6-triol, butane-1,2,4-triol, octane-1,8 diol, and methyl glycoside. Also, polyether polyols of a higher molecular weight are polyethylene glycol (PEG), polypropylene glycol (PPG), ethylene oxide/propylene oxide copolymer, polytetramethylene glycol, caster oil, liquid type polybutanediol, and polycarbonate diols.

Alicyclic glycols can also be used to prepare the present prepolymer, with the alicyclic glycols being three (3) and six (6) member rings of carbon to carbon attachments including 1,4 cyclohexane glycol, aromatic glycols such as xylene glycol, 1,4 dihydroxyethylbenzene, and hydrogenated bisphenol A.

Other polyolefin polyols that can be used to make cellular foams are polyester polyols, which are diols and triols derived from reactions of a polyvalent alcohols and condensations with a dicarboxylic acids, or their corresponding polycarboxylic acid anhydrides such as, for example, adipic acid, succinic acid, glutaric acid, undecandioic acid, dodecanedioic acid, phthalic acid, terphthalic acid, which can be made with glycerine or diethylene glycol, or triethylene glycol, or the mixtures of these and other glycols mentioned above, such as neopentyl glycol.

The most preferred method for forming the prepolymer involves forming a polyol mixture containing a polyol fire retardant, in particular, a carborane disilanol fire retardant. Additionally, a second polyol mixture containing a polyol fire retardant should be formed, with the second polyol mixture containing a fire retardant which is selected from the group consisting of boron, silicon, and halogen compounds. More particular, the fire retardant polyol will be selected from the group consisting of tetrabromophlthalate diol, tris(polyoxyalkylene) phosphonate and phosphite esters, tris (chlorinatedpolyol) phosphonate, dibromoneopentyle glycol, polyoxyethyl tetrabromo bisphenol A, tetrabromo bisphenol A, and tetrabromophthalate diols. Once this polyol mixture containing a fire retardant other than a carborane disilanol is formed, the two polyol mixtures will be combined. The combined polyol mixture will then be capped with an isocyanate to form the prepolymer. It is desirable to have more than one type of fire retardant in the prepolymer as this will allow for the formation of a foam that chars to prevent the spread of fire and the transmission of heat and which will additionally have a fire retardant that works in the gas phase to stifle the amount of oxygen available to be used to form fire and transmit heat. As such, this is a duel fire retarding system that effectively resists the spread of fire and the transmission of heat. Thus, it is most preferred to have a prepolymer mixture containing a carborane disilanol fire retardant polyol and another fire retardant polyol other than carborane disilanol.

Once the polyols have been blended together, and preferably had the moisture removed, an amount of isocyanate is added thereto to form the prepolymer. The isocyanate should be thoroughly reacted with the polyol solution so that there is less than 10% free N=C=O. Any isocyanate can be used to form the prepolymer. Preferably, a diisocyanate is used to form the prepolymer, with toluene diisocyanate being the most preferred isocyanate. The isocyanate is added in an amount equal to between about 20% and about 50% by weight of the prepolymer. The isocyanate will react with the polyol mixture to form the prepolymer. Importantly, the isocyanate will allow the prepolymer to react with an aqueous solution to form the polyurea foam. In particular, the isocyanate will react with water molecules to generate carbon dioxide and initiate the formation of the foam. Among the isocyanates suitable for use in the present invention are toluene diisocyanate, 4,4'-diphenylmethane diisocyanate, 1,6-hexamethylene diisocyanate, 1,5-naphthante diisocyanate, 3,3'dimethoxy-4,4'-biphenyl diisocyanate (toluene diisocyanate), phenylene diisocyanate, and 4,4'biphenyl diissocyanate (xenylene diisocyanate). The most preferred toluene diisocyanate is a mixture of 2,4 and 2,6 isomer of toluene diisocyanate. Reaction of the isocyanate with the water will allow for the formation polyurea linkages when the foam is formed.

The prepolymer will preferably be comprised of an amount of diol ranging between about 30% and about 70% by weight of the prepolymer and a triol equal to from about 0.1% to about 10% by weight of the prepolymer. The fire retardant polyol is preferably added in an amount equal to 0.1% to about 10% by weight of the prepolymer. The isocyanate is added in an amount equal to from about 20% to about 50% by weight of the prepolymer. More preferably, the prepolymer will be comprised of an amount of diol equal to between about 60% and about 66% by weight of the prepolymer, a triol equal to from about 0.5% to about 3% by weight of the prepolymer, a fire retardant polyol equal to from about 2% to about 4% by weight of the prepolymer, and an isocyanate equal to from about 30% to about 33% by weight of the prepolymer. Importantly, regardless of the specific polyols added together to form the prepolymer, the prepolymer will be comprised of an amount of fire retardant polyol equal to from about 0.1% to about 10% by weight of the prepolymer, an amount of isocyanate equal to from about 20% to about 50% by weight of the prepolymer, and an amount of polyol equal to from about 30% to about 80% by weight of the prepolymer.

An alternative to adding the constituents according to weight percent is to measure the addition of each constituent by moles. The diol can be added in an amount equal to between about 3 moles and about 4 moles. The polyol fire retardant can be added in an amount equal to less than 1 mole and the triol can be added in an amount equal to between about 2 moles and about 4 moles.

After formation of the prepolymer an amount of an aqueous solution can be blended with the prepolymer. The aqueous solution will catalyze a reaction with the prepolymer so that a reaction results that causes $CO_2$ gas formation, which in turn causes the formation of the ablative polyurea foam. In essence the aqueous solution is a blowing agent that causes the polyurea foam formation. The amount of aqueous solution added to the prepolymer is equal to preferably twice the amount by weight of the prepolymer and the aqueous solution may be equal to as much as 600% by weight of the prepolymer. The aqueous solution can be added in an amount equal to between about 5% and about 600% by weight of the prepolymer. More preferably the aqueous solution is added in an amount equal to between about 200% and about 600% by weight of the prepolymer. Any amount of the aqueous solution may be added so long as the prepolymer is reacted to form a polyurea foam. Among the aqueous solutions that can be used are water, silicon emulsions, polyvinyl chloride emulsions, and any other aqueous emulsion having a fire retardant. Importantly, the aqueous emulsion must have a sufficient amount of water to cause formation of the polyurea foam. The silicon emulsion is the most preferred aqueous solution for use in the present invention. Further, the aqueous solution selected will be determined in part by the level of reticulation desired in the foam. A foam having large cells will be formed if only water is used and a foam having smaller cells will be formed if an emulsion is used. As the amount of water in the emulsion decreases the cell size will decrease.

Other catalysts may be used with the aqueous solution to catalyze the prepolymer.

EXAMPLES

Example 1

A prepolymer for forming a flexible fire resistant ablative hydrophilic polyurea foam was prepared. First, a 5000 gram glass reaction kettle having four necks was heated to 120° F. in an oven and then placed in a jacket for heating the reaction kettle. The reaction kettle was then purged with nitrogen gas for 15 minutes. Next 60.66 gm of a diol, Poly-G polyethylene glycol, 1000 series made by Olin, was placed in the reaction kettle. The jacket temperature was 180° F. which was a temperature sufficient to melt the diol, as the diol is a waxy solid.

Once the diol was liquefied an amount of ablative fire retardant polyol, namely carborane-disilanol and more specifically C,C'-Bis(hydroxydimethylsilyl)neocarborane, was added to the diol in an amount equal to 4.21 gm. Next a triol, namely trimethylolethane manufactured by Pitman-Moore, Mundelein, Ill., and sold under the name Trimet and having CAS registry number 77-85-0 was added to the diol and fire retardant polyol mixture. The triol was added in an amount equal to 1.66 gm.

After the polyol mixture was blended a vacuum was pulled while the mixture continued to be heated at 180° F. The reaction kettle was attached to a water trap so that when water from a faucet was turned on a vacuum was pulled in the reaction kettle. The vacuum continued to be pulled until there was no more visible condensation on the walls of the reaction kettle. Nitrogen gas was then added to the reaction kettle to form a nitrogen blanket over the polyol mixture.

An amount of toluene diisocyanate which was an 80/20 by weight 2,4 and 2,6 isomer of toluene diisocyanate was then added to the polyol mixture. The amount of toluene diisocyanate (TDI) was equal to 33.47 gm was added to the polyol mixture. The TDI was slowly added to ensure that it was thoroughly reacted with the polyol mixture. Also, the TDI could not be added to fast otherwise it would react with the polyols and cause foam formation prior to the addition of the aqueous solution. A temperature of about 110° C. was maintained the entire time the TDI was added. At the conclusion of adding the TDI 6.72% of free N=C=O remained unreacted. The percent N=C=O unreacted was determined by taking a sample and analyzing it with an infrared spectrophotometer using a Karl Fisher titration technique. After the addition of the TDI was completed the prepolymer was formed. The TDI addition took approximately 3 hours.

It should be noted that 3.8 equivalent moles of diol, 0.2 equivalent moles of fire retardant polyol, and 3 equivalent moles triol were added together to form the polyol mixture.

The resulting prepolymer material was a clear amber material and was sealed under a nitrogen blanket until further use. An ablative char former was imparted to this prepolymer.

Example 2

A prepolymer for forming a flexible fire resistant ablative hydrophilic foam was prepared the same as in Example 1 except C,C'-Bis(hydroxydiphenylsilyl)neocarborane was substituted for C,C'-Bis(hydroxydimethylsilyl) neocarborane. Again a prepolymer was formed that was a clear amber material and the prepolymer was again sealed under a nitrogen blanket until further use. An ablative char former was imparted to this prepolymer.

Example 3

A prepolymer for forming a flexible fire resistant ablative hydrophilic polyurea foam was prepared. First, a 5000 gm glass reaction kettle having four necks was heated to 120° F. in an oven and then placed in a jacket for heating the reaction kettle. The reaction kettle was then purged with nitrogen gas for 15 minutes. Next 65.94 gm of a diol, Poly-G polyethylene glycol, 1000 series made by Olin, was placed in the reaction kettle. The jacket temperature was 180 F. which was a temperature sufficient to melt the diol, as the diol is a waxy solid.

Once the diol was liquefied an amount of fire retardant polyol, namely a phosphonate ester and more specifically a Diethyl-N,n-bis(2-hydroxyethyl) aminomethyl phosphonate having CAS number 2781-11-5 was added to the diol in an amount equal to 0.82 gm. Next a triol, namely powdery TRIS (2-hydroxyethyl) isocyanate was added to the diol and fire retardant polyol mixture. The triol was added in an amount equal to 2.29 gm.

After the polyol mixture was blended a vacuum was pulled while the mixture continued to be heated at 180° F. The reaction kettle was attached to a water trap so that when water from a faucet was turned on a vacuum was pulled in the reaction kettle. The vacuum continued to be pulled until there was no more visible condensation on the walls of the reaction kettle. Nitrogen gas was then added to the reaction kettle to form a nitrogen blanket over the polyol mixture.

An amount of toluene diisocyanate which was an 80/20 by weight 2,4 and 2,6 isomer of toluene diisocyanate was then added to the polyol mixture. The amount of toluene diisocyanate (TDI) was equal to 30.95 gm was added to the polyol mixture. The TDI was slowly added to ensure that it was thoroughly reacted with the polyol mixture. Also, the TDI could not be added too fast otherwise it would react with the polyols and cause foam formation prior to the addition of the aqueous solution. A temperature of about 110° C. was maintained the entire time the TDI was added. At the conclusion of adding the TDI 8.0% of free N=C=O remained unreacted. The percent N=C=O unreacted was determined by taking a sample and analyzing it using a Karl Fisher titration technique. After the addition of the TDI was completed the prepolymer was formed. The TDI addition took approximately 3 hours.

It should be noted that 4.0 equivalent moles of diol, 0.2 equivalent moles of fire retardant polyol, and 0.8 equivalent moles triol were added together to form the polyol mixture.

The finished prepolymer was clear and had a low viscosity. The prepolymer of the present invention had a different fire retardant in the backbone as this prepolymer had phosphorous and nitrogen moieties in the backbone as opposed to the carborane moiety of Examples 1 and 2. A solid phase char former was imparted to the prepolymer.

Example 4

A prepolymer was prepared the same as Example 3 except 62.57 gm of diol and 2.72 gm of triol were used. Also, a different fire retardant polyol was used, namely a brominated phenol and more specifically a tetra bromo bisphenol A manufactured by Great Lakes and having product number BA-50. The fire retardant polyol was added in an amount equal to 3.40 gm. The TDI was added in an amount equal to 31.30 gm. It should be noted that 4.0 equivalent moles of diol, 0.4 equivalent moles of fire retardant polyol, and 1.0 equivalent moles of triol were added together to form the polyol mixture.

The prepolymer was a light amber color and had a low viscosity. A gas phase fire retardant was imparted to the prepolymer.

Example 5

A prepolymer was prepared wherein 50 gm of prepolymer formed according to Example 1 was blended with 50 gm of prepolymer formed according to Example 3. The prepolymer was a light amber color and had a low viscosity. Additionally, the fire retardant prepolymer had two different fire retardants in the backbone, namely a carborane disilanol fire retardant and a phosphanate ester. As such, both gas phase and char former and ablative fire retardancy was imparted to the prepolymer Example 6

A prepolymer was prepared wherein 50 gm of prepolymer formed according to Example 1 was blended with 50 gm of prepolymer formed according to Example 4. The prepolymer was a light amber color and had a low viscosity. Additionally, the fire retardant prepolymer had two different fire retardants in the backbone, namely a carborane disilanol fire retardant and a brominated phenol. As such, both gas phase and char former and ablative fire retardancy was imparted to the prepolymer.

Example 7

A prepolymer was prepared wherein 50 gm of prepolymer formed according to Example 1 was blended with 25 gm of prepolymer formed according to Example 3 and 25 gm of prepolymer formed according to Example 4. The prepolymer was a light amber color and had a low viscosity. Additionally, the fire retardant prepolymer had two different fire retardants in the backbone, namely a carborane disilanol fire retardant and a brominated phenol. As such, both gas phase and char former and ablative fire retardancy was imparted to the prepolymer.

Example 8

A prepolymer was prepared wherein 50 gm of prepolymer formed according to Example 2 was blended with 50 gm of prepolymer formed according to Example 3. The prepolymer was a light amber color and had a low viscosity. Additionally, the fire retardant prepolymer had two different fire retardants in the backbone, namely a carborane disilanol fire retardant and a phosphonate ester. As such, both gas phase and char former and ablative fire retardancy was imparted to the prepolymer.

Example 9

A prepolymer was prepared wherein 50 gm of prepolymer formed according to Example 2 was blended with 50 gm of prepolymer formed according to Example 4. The prepolymer was a light amber color and had a low viscosity. Additionally, the fire retardant prepolymer had two different fire retardants in the backbone, namely a carborane disilanol fire retardant and a brominated phenol. As such, both gas phase and char former and ablative fire retardancy was imparted to the prepolymer.

Example 10

A prepolymer was prepared wherein 50 gm of prepolymer formed according to Example 2 was blended with 25 gm of prepolymer formed according to Example 3 and 25 gm of prepolymer formed according to Example 4. The prepolymer was a light amber color and had a low viscosity. Additionally, the fire retardant prepolymer had two different fire retardants in the backbone, namely a carborane disilanol fire retardant and a phosphonate ester. As such, both gas phase and char former and ablative fire retardancy was imparted to the prepolymer.

Example 11

A polyurea foam formed from the prepolymer of Example 1 was prepared. In a bowl 100 gm of the prepolymer composition was mixed with 400 gm of an aqueous solution. The prepolymer and aqueous solution were stirred for 20 seconds with a mixer at a speed of 1300 rpm. The aqueous solution was a commercially available silicon emulsion, that was 60% solids, and was sold by GE under product number sm 2138. The silicon emulsion was a reactive poly dimethysiloxane. After mixing, the prepolymer and aqueous solution mixture was poured into a 3 inch diameter and 6 inch tall cylinder having release paper at the bottom of the cylinder. A spontaneous exothermic reaction producing carbon dioxide resulted and the reaction terminated in about 3 minutes: At the end of the reaction a polyurea foam was formed having a height of about 7 inches.

Example 12

A polyurea foam was prepared the same as Example 11 except the prepolymer of Example 2 was reacted with the aqueous solution. Additionally, the prepolymers of Examples 3–10 were reacted with the aqueous solution of Example 11 to form a polyurea foam.

Example 13

The ablative polyurea foam formed according to Example 11 was tested to determine its level of fire resistance. The specimen was tested in an oxygen calorimeter (known as a cone calorimeter) according to ASTM testing procedure E 1354-90. The oxygen calorimeter includes a conical shaped radiant electric heater, an exhaust gas system with oxygen monitoring and flow measuring instrumentation, and a data collection and analysis system. The test method was used to determine the ignitability, heat release rates, mass loss rates, effective heat of combustion, and visible smoke development of materials and products.

To initiate the test the foam specimen was placed in the calorimeter at a horizontal orientation. The foam specimen was then subjected to a predetermined external heat flux so that the foam specimen exposed to radiant heat or a heat flux of from about 0 to about 100 kW/m$^2$. In the present example, as can be seen below, the specimen was specifically subjected to a heat flux of 75.0 kW/m$^2$. Heat flux relates to the amount of energy the specimen is subjected to. The foam specimen had a thickness of 6.3 mm and a initial mass of 47.5 g. The mass of the sample was taken before exposure to the heat flux and after to determine how much mass was lost as a result of exposure to the heat flux. While the foam was exposed to the heat flux a variety of measurements were taken to provide a range of different types of data. Essentially, the test determined whether a foam or other material was suitable for use as a fire retardant material.

The rate of heat release was determined by measuring the oxygen consumption as determined by the oxygen concentration and the flow rate in the exhaust product stream, with the oxygen consumption relating to the expression of the relationship between the mass of oxygen consumed during combustion and the heat released. The rate of heat release is the total rate as a function of time. As such, the data produced related to the peak and average rate of heat release (kW/m$^2$), which showed the magnitude of the fire and the amount of heat released from the fire. Thus, the heat release rate concerns the amount of heat evolved from a specimen per unit of time, with the total heat release showing the probability of igniting other items. The rate of heat release is one of the most important variables, in many cases the single most important variable, in determining the hazard from a fire.

The effective heat of combustion is determined from a concomitant measurement of specimen mass loss rate in combination with the heat release rate, so that the effective heat of combustion measures the difference between the heat flux and the heat released from the sample. Effective heat of combustion means the measured heat release divided by the mass loss for a specified time period. Importantly, this allows for determination of how much heat passes through the specimen or sample. Additionally, the effective heat of combustion is expressed MJ/kg.

Smoke factor, carbon monoxide and carbon dioxide produced, was recorded and indicated the smoke generation from the sample in a real fire. The smoke factor is measured by obstruction of light by the combustion product stream, with the obstruction relating to the reduction of light transmission by smoke, as measured by light attenuation. A laser is present in the oxygen calorimeter device so that smoke level can be determined.

External ignition, when used, is by electric spark, with the time to ignition/peak RHR showing the propensity of the fire to flashover the sample. As such, the time to ignition shows the sample ignitability. Ignitability means the propensity to ignition, as measured by the time to sustained flaming, in seconds, at a specified heating flux.

The specific extinction area relates to the area of the mass required to extinguish the fire.

The data collected was as follows:

Specimen thickness 6.3 mm
Specimen initial mass 47.5 gm
Heat flux was 75.0 kW/m$^2$
Exhaust duct flow rate of 0.024 m$^3$/s
The sample specimen had a horizontal orientation
The specimen ignited in 4 seconds
Total heat evolved was 226.0 kJ
The mass lost was 20.9 g
Further data collected on the specimen was as follows:

| Peak and average values | Peak | Time(s) | Average |
|---|---|---|---|
| Heat release rate (kW/m$^2$) | 74.8 | 105 | 56.5 |
| Eff. heat of comb. (MJ/kg) | 13 | 335 | 10.8 |
| Specific ext. area (m$^2$/kg) | 58.1 | 400 | 22.5 |
| Carbon monoxide: (kg/kg) | 0.1081 | 400 | 0.0261 |
| Carbon dioxide: (kg/kg) | 0.78 | 165 | 0.58 |
| Average during period from ignition to ignition plus | | | |
| | 1 min | 2 min | 3 min | 4 min | 5 min | 6 min |
| Heat release rate (kW/m$^2$) | 48 | 60.5 | 62.4 | 62 | 61.1 | 58.9 |
| Eff. heat of comb. (MJ/kg) | 7.9 | 9 | 9.6 | 101 | 10.4 | 10.7 |
| Specific ext. area (m$^2$/kg) | 27.9 | 20.8 | 16.4 | 17.8 | 19.7 | 21.1 |
| Carbon monoxide: (kg/kg) | 0.0082 | 0.0116 | 0.0157 | 0.0183 | 0.0196 | 0.0223 |
| Carbon dioxide: (kg/kg) | 0.17 | 0.38 | 0.49 | 0.54 | 0.56 | 0.58 |

The heat release rate, effective heat of combustion, and total heat evolved were all satisfactory for a retarding composition. Very little mass was lost and the specific extinction area was fairly small. The amount of carbon dioxide and carbon monoxide released was relatively insignificant and also meant the foam had suitable fire retardancy. Importantly, the effective heat of combustion averaged 10.8 meaning there was little energy increase between the heat flux and the amount of heat released from the sample. It was also observed that the specimen formed a char layer and that heat and flames did not readily release off of the specimen. It was determined that the specimen had excellent flame retarding characteristics.

Example 14

A test was performed on the foam formed according to Example 11. The test was the same as in Example 13, with the data as follows:

Specimen thickness: 6.3 mm
Specimen initial mass: 50.0 g
Heat flux: 25.0 kW/m$^2$
Exhaust duct flow rate: 0.024 m$^3$/s
Orientation: Horizontal
Time to ignition: 15 sec
Total heat evolved: 152.2 kJ
Mass loss: 16.7 g

| Peak and average values | Peak | Time(s) | Average |
|---|---|---|---|
| Heat release rate (kW/m$^2$) | 55.4 | 355 | 38 |
| Eff. heat of comb. (MJ/kg) | 13.5 | 395 | 9 |
| Specific ext. area (m$^2$/kg) | 41.9 | 5 | 5.7 |
| Carbon monoxide: (kg/kg) | 0.0564 | 390 | 0.0305 |
| Carbon dioxide: (kg/kg) | 0.88 | 390 | 0.45 |
| Average during period from ignition to ignition plus | | | |
| | 1 min | 2 min | 3 min | 4 min | 5 min | 6 min |
| Heat release rate (kW/m$^2$) | 16.6 | 25.8 | 28.3 | 30.5 | 33.3 | 36.6 |
| Eff. heat of comb. (MJ/kg) | 6.9 | 7.6 | 7.5 | 7.7 | 8.1 | 8.6 |
| Specific ext. area (m$^2$/kg) | 19.3 | 8.3 | 6 | 6.2 | 5.1 | 4.6 |
| Carbon monoxide: (kg/kg) | 0.0114 | 0.0156 | 0.0241 | 0.0291 | 0.0307 | 0.0294 |
| Carbon dioxide: (kg/kg) | 0.07 | 0.25 | 0.31 | 0.35 | 0.38 | 0.42 |

The fire retardant prepolymer had two different fire retardants in the backbone, namely a carborane disilanol fire retardant and a brominated phenol. As such, both gas and char fire retardancy was imparted to the prepolymer.

Again, the foam showed excellent fire retarding capabilities. Importantly, the effective heat of combustion averaged 9 meaning that the foam was effective.

The remaining tests were performed for comparative purposes only.

Example 15

A test was performed the same as Example 13 except the foam material was produced by a third party and was known as polymethylmethacrylate (PMMA) which is a rigid plastic. The test was to calibrate the oxygen calorimeter. The results were as follows:

Specimen thickness: 6.3 mm
Specimen initial mass: 310.8 g
Heat flux: 50.0 kW/m$^2$
Exhaust duct flow rate: 0.024 m$^3$/s
Orientation: Horizontal
Time to ignition: 22 sec
Total heat evolved: 8104.6 kJ
Mass loss: 284.3 g

| Peak and average values | Peak | Time(s) | Average |
| --- | --- | --- | --- |
| Heat release rate (kW/m$^2$) | 961.7 | 1075 | 686.8 |
| Eff. heat of comb. (MJ/kg) | * | 1185 | 28.5 |
| Specific ext. area (m$^2$/kg) | 213.9 | 1170 | 125.8 |
| Carbon monoxide: (kg/kg) | 0.0747 | 290 | 0.0096 |
| Carbon dioxide: (kg/kg) | * | 1115 | 2.1 |

Average during period from ignition to ignition plus

| | 1 min | 2 min | 3 min | 4 min | 5 min | 6 min |
| --- | --- | --- | --- | --- | --- | --- |
| Heat release rate (kW/m$^2$) | 429.2 | 503 | 547.4 | 581.7 | 612.2 | 624.2 |
| Eff. heat of comb. (MJ/kg) | 24.7 | 25.4 | 26 | 26.7 | 27.5 | 27.6 |
| Specific ext. area (m$^2$/kg) | 141.7 | 139.5 | 135.3 | 133.8 | 135.7 | 134.3 |
| Carbon monoxide: (kg/kg) | 0.0018 | 0.0046 | 0.0034 | 0.0111 | 0.0239 | 0.0225 |
| Carbon dioxide: (kg/kg) | 0.72 | 1.24 | 1.48 | 1.62 | 1.73 | 1.8 |

As can be seen the foam when burned produced more carbon dioxide and released a greater amount of heat. Importantly, the effective heat of combustion was much higher, it was 28.5 as compared to 9 and 10.8 which were the values associated with the present foam. Also, the heat evolved was equal to 8104.6 kJ, which is very high.

Example 16

A test was performed the same as Example 13 except the foam material was a polyurethane foam having a reactive type fire retardant, specifically a tetra bromo bisphenol A, with the foam being blown by a CFC blowing agent. Such foam is known to have excellent fire retardancy. The results were as follows:

Specimen thickness: 6.3 mm

Specimen initial mass: 11.8 g

Heat flux: 35.0 kW/m$^2$

Exhaust duct flow rate: 0.024 m$^3$/s

Orientation: Horizontal

Time to ignition: No ignition

Total heat evolved: 244.3 kJ

Mass loss: 10.9 g

| Peak and average values | Peak | Time(s) | Average |
| --- | --- | --- | --- |
| Heat release rate (kW/m$^2$) | 286.8 | 57 | 162.9 |
| Eff. heat of comb. (MJ/kg) | 52.7 | 98 | 22.4 |
| Specific ext. area (m$^2$/kg) | 2434 | 16 | 338.7 |
| Carbon monoxide: (kg/kg) | 0.21 | 16 | 0.0566 |
| Carbon dioxide: (kg/kg) | * | 98 | 1.3 |

Average during period from ignition to ignition plus

| | 1 min | 2 min | 3 min | 4 min | 5 min | 6 min |
| --- | --- | --- | --- | --- | --- | --- |
| Heat release rate (kW/m$^2$) | 156 | 178.6 | — | — | — | — |
| Eff. heat of comb. (MJ/kg) | 17.1 | 21.6 | — | — | — | — |
| Specific ext. area (m$^2$/kg) | 580.3 | 371.7 | — | — | — | — |
| Carbon monoxide: (kg/kg) | 0.0859 | 0.0601 | — | — | — | — |
| Carbon dioxide: (kg/kg) | 0.44 | 1.08 | — | — | — | — |

[* denotes reliable results unobtainable]

As can be seen, the polyurethane foam had results similar to the present invention. However, the polyurethane foam allowed for a greater amount of heat to evolve and the heat release rate was much higher. The effective heat of combustion which was 22.4 MJ/kg as compared to 9 and 10.8 which were the values associated with the present foam.

Example 17

A test was performed the same as Example 13 except the foam material was produced by a third party and was known as commercial vinyl-nitrile sponge which is a rigid foam blown by a CFC. Such foam is know to have excellent fire retardancy. The results were as follows:

Specimen thickness: 6.3 mm

Specimen initial mass: 10.1 g

Heat flux: 75.0 kW/m$^2$

Exhaust duct flow rate: 0.024 m$^3$/s

Orientation: Horizontal

Time to ignition: 2 sec

Total heat evolved: 83.5 kJ

Mass loss: 5.4 g

| Peak and average values | Peak | Time(s) | Average |
| --- | --- | --- | --- |
| Heat release rate (kW/m$^2$) | 74.5 | 20 | 41.8 |
| Eff. heat of comb. (MJ/kg) | 25.6 | 135 | 15.3 |
| Specific ext. area (m$^2$/kg) | 770.4 | 5 | 264.5 |
| Carbon monoxide: (kg/kg) | 0.1499 | 165 | 0.0577 |
| Carbon dioxide: (kg/kg) | 1.72 | 140 | 0.64 |

Average during period from ignition to ignition plus

| | 1 min | 2 min | 3 min | 4 min | 5 min | 6 min |
| --- | --- | --- | --- | --- | --- | --- |
| Heat release rate (kW/m$^2$) | 55.1 | 49.7 | 43.6 | — | — | — |
| Eff. heat of comb. (MJ/kg) | 11.7 | 14 | 15.9 | — | — | — |
| Specific ext. area (m$^2$/kg) | 420.4 | 340.3 | 293.3 | — | — | — |
| Carbon monoxide: (kg/kg) | 0.0317 | 0.0394 | 0.0552 | — | — | — |
| Carbon dioxide: (kg/kg) | 0.25 | 0.51 | 0.66 | — | — | — |
| HCl: (kg/kg) | — | — | — | — | — | — |

As can be seen, the polyurethane foam had results similar to the present invention. However, the polyurethane foam allowed for a greater amount of heat to evolve and the heat release rate was much higher. The effective heat of combustion which was 15.3 MJ/kg as compared to 9 and 10.8 which were the values associated with the present foam.

Example 18

The foam formed according to Example 11 was machined to a 6 inch cylinder shape, left in a cylinder, and placed in a fire testing assembly 12 inches from an impinging fire source having 5 inch orifice. The fire source was formed from propane gas at 12 psig. This gave a flame temperature of about 1900° C.

A thermocouple was placed at the end of the cylinder of foam by drilling a small guiding hole into the backside of the foam and embedding the thermocouple in the foam's backside. Another thermocouple was placed in front of the impinging fire. The thermocouples were connected to a recording device and the backside heat was recorded as the fire was in progress. The fire lasted two (2) hours and the back side temperature did not exceed more than 216° F. No separation of the foam from the cylinder was observed. The foam kept its integrity and adhered strongly to the inside portion of the cylinder throughout the two hour test period. A strong char layer formed in front of the fire on the foam which later, as the fire was in progress, vitrified to form a glassy char protecting the rest of the foam from the spreading of the fire throughout the foam.

Additionally, a blowing agent may be used to form the fire resistant ablative polyurea foam and a catalyst may be used to form the fire resistant ablative polyurea foam.

Thus, there has been shown and described a novel ablative polyurea foam, a polyurea foam prepolymer, and methods for forming the polyurea foam and the prepolymer, which fulfill all of the objects and advantages sought therefor. It will be apparent to those skilled in the art, however, that many changes, variations, modifications, and other uses and applications for the subject method and compositions are possible, and also changes, variations, modifications, and other uses and applications which do not depart from the spirit and scope of the invention are deemed to be covered by the invention which is limited only by the claims which follow.

What is claimed is:

1. A foam prepolymer comprised of:
   a) an amount of a diol having a molecular weight ranging, between about 50 and 5000, with said diol added in an amount equal to from about 30% to about 70% by weight of said prepolymer;
   b) a polyol fire retardant added in an amount equal to from about 0.1% to about 10% by weight of said prepolymer;
   c) a triol having a molecular weight ranging between about 50 and 5000 and equal to from about 0.1% to about 10% by weight of said prepolymer; and, d) an isocyanate equal to from about 20% to about 50% by weight of said prepolymer, wherein said prepolymer can be activated to form an ablative fire resistant foam.

2. The foam prepolymer of claim 1 wherein said diol has a molecular weight ranging between about 50 and about 4000.

3. The foam prepolymer of claim 1 wherein said diol is of the formula:

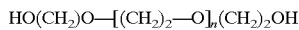

where n is equal to between 6 and 30.

4. The foam prepolymer of claim 1 wherein said diol and triolare is selected from the group consisting of polyoxyethylene, polyoxypropylene glycol, ethylene glycol, diethylene glycol, triethylene glycol, tetraethylene glycol, propylene glycol, dipropyleneglycol, 1,3 butanediol, 1,4 butanediol, polybutylene glycol, 1,5 pentanediol, 2-methyl-1,3-propanediol, neopentyl glycol, 1,6 hexane diol, hexane-1,2,6-triol, butane-1,2,4-triol, octane-1,8 diol, methyl glycoside, polyether polyol, and combinations thereof.

5. The foam prepolymer of claim 1 wherein said diol has a hydroxyl functionality equal to at least two.

6. The foam prepolymer of claim 1 wherein said polyol fire resistant is selected from the group consisting of C,C'-Bis (hydroxydimethylsilyl)neocarborane, C,C'-Bis (hydroxydiphenylsilyl)neocarborane, tetrabromophlthalate diol, tris(polyoxyalkylene) phosphonate, tris (polyoxyalkylene) phosphite ester, tris(chlorinatedpolyol) phosphonate, dibromoneopentyl glycol, polyoxyethyl tetrabromo bisphenol A, tetrabromo bisphenol A, tetrabromophthalate diols, and combinations thereof.

7. The foam prepolymer of claim 1 wherein said polyol fire retardant is comprised of a fire retardant selected from the group consisting of phosphorus, boron, silicon, and halogen atoms.

8. The foam prepolymer of claim 1 wherein said polyol fire retardant is comprised of a carborane disilanol fire retardant.

9. The foam prepolymer of claim 1 wherein said isocyanate is selected from the group consisting of tolylene diisocyanate, 4,4'-diphenylmethane diisocyanate, 1,6-hexamethylene diisocyanate, 1,5-naphthante diisocyanate, 3,3'dimethoxy-4,4'-biphenyl disocyanate (tolidine diisocyanate), phenylene diisocyanate, 4,4'biphenyl diisocyanate (xenylene diisocyanate), and combinations thereof.

10. The foam prepolymer of claim 1 wherein said triol has a molecular weight ranging between about 80 and 4000.

11. The foam prepolymer of claim 1 wherein said triol is selected from the group consisting of trimethylolethane, trimethylol propane, and high molecular weight triols.

12. The foam prepolymer of claim 1 wherein said triol is of the formula:

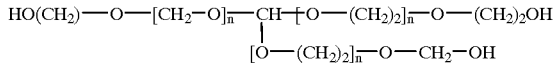

where n is equal to between 6 and 30.

13. The foam prepolymer of claim 1 wherein said diol is added in amount equal to between about 3 equivalent moles and about 4 equivalent moles, said polyol fire retardant is added in an amount equal to between about 0.1 equivalent moles and about 1 equivalent mole, and said triol is added in an amount equal to between about 2 equivalent moles and about 4 equivalent moles.

14. The foam prepolymer of claim 1 wherein said foam prepolymer has less than 10% free N=C=O groups remaining.

15. The foam prepolymer of claim 14 wherein said foam prepolymer has less than 8% free N=C=O groups remaining.

16. A foam prepolymer comprised of:
   a) an amount of a polyol having a molecular weight ranging, between about 50 and 5000, with said polyol added in an amount equal to from about 30% to about 80% by weight of said prepolymer;
   b) a polyol fire retardant added in an amount equal to from about 0.1% to about 10% by weight of said prepolymer; and,
   c) an isocyanate equal to from about 20% to about 50% by weight of said prepolymer, wherein said prepolymer can be activated to form an ablative fire resistant foam.

17. The foam prepolymer of claim 16 wherein said polyol fire retardant is selected from the group consisting of C,C'-Bis (hydroxydimethylsilyl)neocarborane, C,C'-Bis (hydroxydiphenylsilyl)neocarborane, tetrabromophlthalate diol, tris(polyoxyalkylene) phosphonate, tris (polyoxyalkylene) phosphite ester, tris(chlorinatedpolyol) phosphonate, dibromoneopentyl glycol, polyoxyethyl tetrabromo bisphenol A, tetrabromo bisphenol A, tetrabromophthalate diols, and combinations thereof.

18. The foam prepolymer of claim 16 wherein said polyol fire retardant is comprised of a carborane disilanol fire retardant.

19. A foam prepolymer comprised of:
 a) an amount of a polyol having a molecular weight ranging, between about 500 and 10,000, with said polyol added in an amount equal to from about 30% to about 80% by weight of said prepolymer;
 b) a first polyol fire retardant added in an amount equal to from about 0.1% to about 10% by weight of said prepolymer;
 c) a second polyol fire retardant added in an amount equal to from about 0.1% to about 10% by weight of said prepolymer; and, d) an isocyanate equal to from about 20% to about 50% by weight of said prepolymer.

20. The foam prepolymer of claim 19 wherein said first polyol fire retardant is selected from the group consisting of C,C'-Bis (hydroxydimethylsilyl)neocarborane, and C,C'-Bis (hydroxydiphenylsilyl)neocarborane.

21. The foam prepolymer of claim 19 wherein said second polyol fire retardant is selected from the group consisting of tetrabromophlthalate diol, tris(polyoxyalkylene) phosphonate, tris(polyoxyalkylene) phosphite ester, tris (chlorinatedpolyol) phosphonate, dibromoneopentyl glycol, polyoxyethyl tetrabromo bisphenol A, tetrabromo bisphenol A, tetrabromophthalate diols, and combinations thereof.

22. A polyol prepolymer having a molecular weight ranging between about 1000 and about 2000 wherein said prepolymer is comprised of a carborane disilanol polyol fire retardant.

23. The polyol prepolymer of claim 22 wherein said polyol prepolymer has less than 10% available free N=C=O.

24. The polyol prepolymer of claim 22 wherein said polyol fire retardant is selected from the group consisting of C,C'-Bis (hydroxydimethylsilyl)neocarborane and C,C'-Bis (hydroxydiphenylsilyl)neocarborane.

25. A fire resistant polyurea foam comprised of a polyol composition containing a fire retardant and an aqueous solution, wherein said fire retardant is a carborane disilanol present in an amount equal to between about 0.1% and about 10% by weight of said polyol composition, with said aqueous solution added in an amount equal to between about 5% and about 600% by weight of said polyol composition.

26. The fire resistant polyurea foam of claim 25 wherein said aqueous solution is selected from the group consisting of water, silicon emulsions, and polyvinyl chloride emulsions.

27. The fire resistant polyurea foam of claim 25 wherein said aqueous solution is added in an amount equal to between about 200% and about 600% by weight of said polyol composition.

28. The fire resistant polyurea foam of claim 25 wherein said fire retardant is selected from the group consisting of C,C'-Bis (hydroxydimethylsilyl)neocarborane and C,C'-Bis (hydroxydiphenylsilyl)neocarborane.

29. The fire resistant polyurea foam of claim 25 wherein said polyol composition is comprised of an amount of a diol having a molecular weight ranging, between about 50 and 5000, with said diol added in an amount equal to from about 30% to about 70% by weight of said polyol composition, a triol having a molecular weight ranging between about 50 and 5000 and equal to from about 0.1% to about 10% by weight of said polyol composition, and, an isocyanate equal to from about 20% to about 50% by weight of said polyol composition.

30. A fire resistant polyurea foam comprised of a polyol composition containing a fire retardant and an aqueous solution, wherein said fire retardant is selected from the group consisting of C,C'-Bis (hydroxydimethylsilyl) neocarborane, C,C'-Bis (hydroxydiphenylsilyl) neocarborane, tetrabromophlthalate diol, tris (polyoxyalkylene) phosphonate, tris(polyoxyalkylene) phosphite ester, tris(chlorinatedpolyol) phosphonate, dibromoneopentyl glycol, polyoxyethyl tetrabromo bisphenol A, tetrabromo bisphenol A, tetrabromophthalate diols, and combinations thereof with said polyol composition containing said fire retardant in an amount equal to between about 0.1% and about 10% by weight of said polyol composition, with said aqueous solution added in an amount equal to between about 5% and about 600% by weight of said polyol composition.

31. A method for forming a polyol prepolymer for a a fire resistant polymeric composition, said method comprising mixing a fire retardant polyol that is comprised of a carborane disilanol with polyol constituents.

32. The method of claim 31 wherein said fire retardant polyol is added in amount equal to between about 0.1% and about 10% by weight of said prepolymer.

33. The method of claim 31 wherein said fire retardant polyol is selected from the group consisting of C,C'-Bis (hydroxydimethylsilyl)neocarborane and C,C'-Bis (hydroxydiphenylsilyl)neocarborane.

34. The method of claim 31 wherein said polyol constituents are added in an amount equal to between about 30% and about 80% by weight of said prepolymer.

35. The method of claim 31 wherein said polyol constituents have a molecular weight ranging between about 50 and 5000.

36. The method of claim 35 wherein said polyol constituents include an amount of isocyanate equal to from about 20% to about 50% by weight of said prepolymer.

37. A method for forming a prepolymer that is water activated and forms an ablative fire resistant polyurea foam comprised of:
 (a) heating a mixture of polyol constituents in a reaction kettle to form a polyol mixture, with said polyol mixture comprised of a diol, a triol, and a polyol fire retardant to a temperature sufficient to liquefy said polyol constituents and substantially evaporate any water found in said constituents, with said polyol fire retardant comprised of fire retardant constituents selected from the group consisting of phosphorus, boron, silicon, and halogens;
 (b) adding an amount of isocyanate to said polyol mixture to form an isocyanate capped prepolymer.

38. The method of claim 37 wherein said diol has a molecular weight equal to between about 50 and 5000 and is added in an amount equal to between about 30% and about 70% by weight of said prepolymer, said polyol fire retardant is added in an amount equal to between about 0.1% and about 10% by weight of said prepolymer, said triol has a molecular weight equal to between about 50 and about 5000 and is added in an amount equal to between about 0.1% and about 10% by weight of said prepolymer, and said isocyanate is added in an amount equal to between about 30% and about 50% by weight of said prepolymer.

39. The method of claim 37 wherein said method includes a step of evacuating the reaction kettle after formation of said polyol mixture.

40. The method of claim 37 wherein said method includes a step of sealing said polyol mixture with a nitrogen blanket.

41. The method of claim 37 wherein said isocyanate is reacted with said polyol mixture so that less than 10% free N=C=O groups remain after formation of said isocyanate capped prepolymer.

42. The method of claim 37 wherein said polyol fire retardant is selected from the group consisting of C,C'-Bis (hydroxydimethylsilyl)neocarborane, C,C'-Bis (hydroxydiphenylsilyl)neocarborane, tetrabromophlthalate diol, tris(polyoxyalkylene) phosphonate, tris(polyoxyalkylene) phosphite ester, tris(chlorinatedpolyol) phosphonate, dibromoneopentyl glycol, polyoxyethyl tetrabromo bisphenol A, tetrabromo bisphenol A, tetrabromophthalate diols, and combinations thereof.

43. A method for forming a prepolymer that is water activated and forms an ablative fire resistant polyurea foam comprised of:
   (a) heating a mixture of polyol constituents in a reaction kettle to form a first polyol mixture, with said polyol mixture comprised of a diol, a triol, and a fire resistant polyol to a temperature sufficient to liquefy said polyol constituents and substantially evaporate any water found in said constituents, with said fire resistant polyol selected from the group consisting of C,C'-Bis (hydroxydimethylsilyl)neocarborane and C,C'-Bis (hydroxydiphenylsilyl)neocarborane;
   (b) heating a mixture of polyol constituents in a reaction kettle to form a second polyol mixture, with said polyol mixture comprised of a diol, a triol, and a polyol fire retardant to a temperature sufficient to liquefy said polyol constituents and substantially evaporate any water found in said constituents, with said polyol fire retardant selected from the group consisting of tetrabromophlthalate diol, tris(polyoxyalkylene) phosphonate, tris(polyoxyalkylene) phosphite ester, tris (chlorinatedpolyol) phosphonate, dibromoneopentyle glycol, polyoxyethyl tetrabromo bisphenol A, tetrabromo bisphenol A, tetrabromophthalate diols, and combinations thereof;
   (c) mixing said first and second polyol mixtures to form a polyol mixture; and,
   (d) adding an amount of isocyanate to said polyol mixture to form an isocyanate capped prepolymer.

44. A method for forming an ablative fire resistant polyurea foam wherein said method is comprised of mixing an aqueous solution with said prepolymer of claim 1, with said aqueous solution added in amount equal to between about 5% and about 600% by weight of said prepolymer.

45. The method of claim 44 wherein said aqueous solution is selected from the group consisting of water, silicon emulsions, and poly vinyl chloride emulsions.

46. The method of claim 44 wherein said aqueous solution is added in amount equal to between about 200% and about 600%.

* * * * *

UNITED STATES PATENT AND TRADEMARK OFFICE
CERTIFICATE OF CORRECTION

PATENT NO. : 6,100,359
DATED : August 8, 2000
INVENTOR(S) : Sina Ghatan

It is certified that error appears in the above-indentified patent and that said Letters Patent is hereby corrected as shown below:

column 2, line 55, "isocynate" should be -- isocyanate -- column 7, line 64, delete "at least"

column 8, line 23, after "diols" insert -- and triols --.

column 10, line 11, "The" should be -- These --.

column 21, line 54, "triolare is" should be -- triol are --.

Signed and Sealed this

Tenth Day of April, 2001

*Attest:*

NICHOLAS P. GODICI

*Attesting Officer*     *Acting Director of the United States Patent and Trademark Office*